US006245579B1

(12) United States Patent
Wenz et al.

(10) Patent No.: US 6,245,579 B1
(45) Date of Patent: Jun. 12, 2001

(54) POLYMERIC METAL COATING

(75) Inventors: Gerhard Wenz, Ettlingen; Denise Freitas Petri; Soo Whan Choi, both of Karlsruhe, all of (DE)

(73) Assignee: Universitat Karlsruhe, Kaplsruhe (DE)

( * ) Notice: Subject to any disclaimer, the term of this patent is extended or adjusted under 35 U.S.C. 154(b) by 0 days.

(21) Appl. No.: 09/284,351

(22) PCT Filed: Aug. 11, 1998

(86) PCT No.: PCT/DE98/02314

§ 371 Date: Jun. 9, 1999

§ 102(e) Date: Jun. 9, 1999

(87) PCT Pub. No.: WO99/09088

PCT Pub. Date: Feb. 25, 1999

(30) Foreign Application Priority Data

Aug. 14, 1997 (DE) .............................................. 197 35 368

(51) Int. Cl.⁷ ..................... G01N 33/548; G01N 33/553; C07K 17/12; C08L 1/08
(52) U.S. Cl. ................. 436/530; 106/14.13; 106/170.46; 435/178; 435/179; 436/524; 436/525; 436/526; 436/527; 436/529; 436/530; 530/391.1
(58) Field of Search ..................................... 436/526, 524, 436/527, 529, 530, 525; 106/170.46, 14.13; 435/178, 179; 530/391.1

(56) References Cited

U.S. PATENT DOCUMENTS

| 4,048,416 | * | 9/1977 | Axen et al. . | |
|---|---|---|---|---|
| 5,248,772 | | 9/1993 | Siiman et al. | 536/112 |
| 5,543,332 | * | 8/1996 | Lihme et al. | 436/528 |
| 6,027,795 | * | 2/2000 | Kabra et al. . | |

FOREIGN PATENT DOCUMENTS

| 22 60 074 | 6/1973 | (DE) . |
|---|---|---|
| 25 23 793 | 12/1975 | (DE) . |
| 37 10 569 | 5/1988 | (DE) . |

OTHER PUBLICATIONS

Angew. Chem., 79, pp. 520–529 (1967).
Makromol. Chem. Macromol Symp. 46, pp. 321–327 (1991).
J. Am. Chem. Soc., vol. 118, pp. 5039–5046 (1996).
J. Am. Chem. Soc., 1990, pp. 558–569, vol. 112.
Annu. Rev. Phys. Chem. 1992, pp. 437–463.
J. Am. Chem. Soc. 1987, pp. 2358–2368.
Advanced Materials, pp. 25–31 (1991) vol. 3.

* cited by examiner

Primary Examiner—Mary E. Ceperley
(74) Attorney, Agent, or Firm—McDermott, Will & Emery

(57) ABSTRACT

The invention relates to water-soluble polymeric thiosulfates, to a method for their preparation by polymer-analogous addition of tetrathionate to unsaturated polymers and to their application in surface coating.

18 Claims, 9 Drawing Sheets

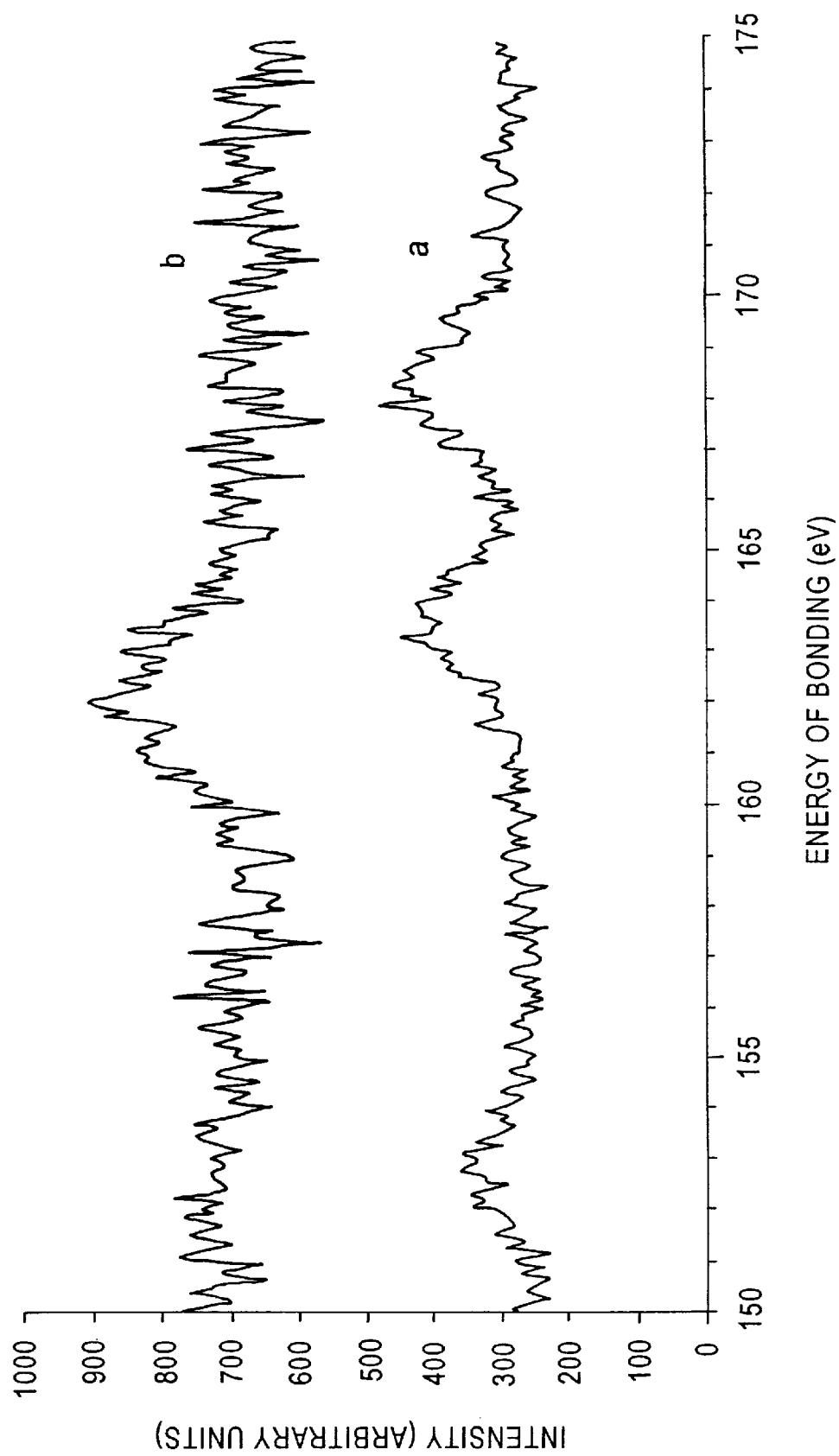

POLYMERIC METAL COATING

DESCRIPTION

Figure 1:
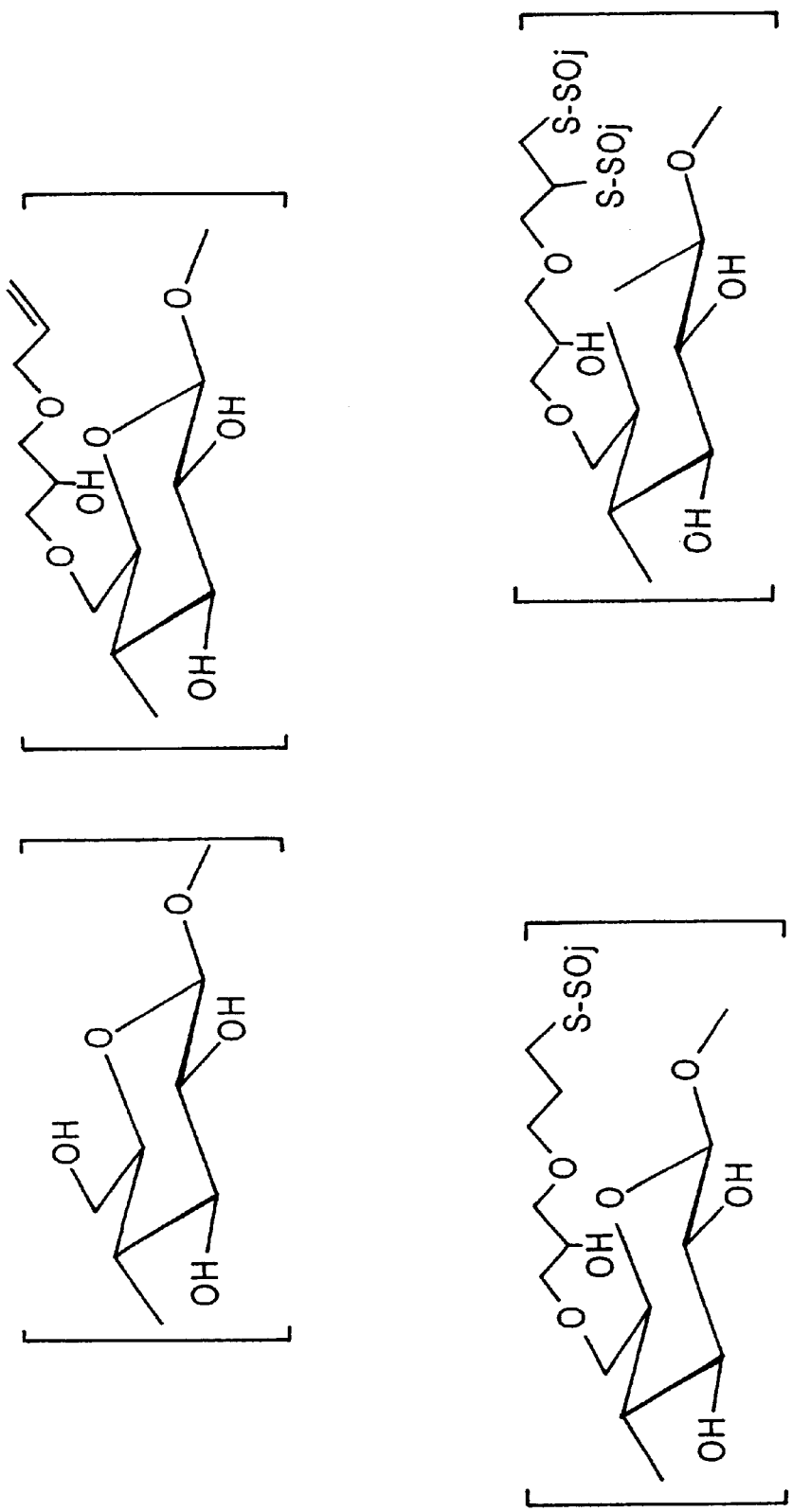

The invention relates to polymeric thiosulfates, to a method for their manufacture and to their application to coating surfaces.

Monomeric alkylthiosulfates (R—S—SO$_3$) are known as Bunte salts [H. Distler, *Angew. Chem.* 1967, 79, pp 520–9]. In general they are prepared by reacting alkylbromides with sodium thiosulfate. Bunte salts are widely applicable. For instance they are used ass insecticides or fungicides, also as radiation protectants and paint additives. Except for polystyrene derivatives [Tabushi et al, *J. Chem. Soc. Japan,* Ind. Chem. Sec., 1964, 67; p 478] no polymeric thiosulfates are known to date in the literature. Nor are any applications of organic thiosulfates known regarding the making of ultrathin films.

The Langmuir-Blodgett technique [F. Embs, D. Funhoff, A. Laschewsky, U. Licht, H. Ohst, W. Prass, H. Ringsdorf, G. Wegner, R. Wehrmann, *Adv. Mater.* 1991, 3, pp 25–31] is used to prepare ultrathin films on solid hydrophobic substrates. However this procedure is unusually costly and suitable only for small, planar surfaces. Moreover this procedure is unsuitable for coating complex structures such as hollow bodies. Moreover depositing layers of polyelectrolyte on charged substrates [G. Decher, J. Schmitt, L. Heiliger, H. U. Siegmund, German Patent application P 433,107.6; G. Decher, J-D. Hong, *Makromol. Chem.,* Macromol. Symp. 1991, 46, pp 321–7] is known, however it is restricted solely to coating charged surfaces. Chemical modification of reactive substrates and chemical adsorption of alkylthiols on metal surfaces is also known [L. H. Dubois, R. G. Nuzzo, *Annu. Rev. Phys. Chem.,* 1992, 43, pp 437–463; R. G. Nuzzo, F. A. Fusco, D. L. Allara, *J. Am. Chem. Soc.* 1987, 109, pp 2358–2368]. The known chemical adsorption of monomeric thiols, for instance alkylthiols, on surfaces of precious and semi-precious metals offers the advantage of being highly selective and that thereby film contamination by impurities can be substantially precluded. Using alkylthiols, it is possible for instance to deposit from solution two-dimensional crystalline monolayers onto gold surfaces. Hydrophobed gold surfaces are thus created. A hydrophilic coating also can be prepared using alkylthiols with hydrophilic end groups, for instance α-ω hydroxyalkylthiols [R. G. Nuzzo, L. H. Dubois, D. L Allara, *J. Am. Chem. Soc.* 1990, 112, pp 558–569]. These described thiols incur the substantial drawback that their water-solubility is low. Accordingly they require using organic solvents in order to be applicable to coating metal surfaces. A further drawback is that the layers produced using known alkylthiols are crystalline. The crystallinity of the coating entails several drawbacks. On one hand crystalline layers form a so-called domain structure. As a result the coating may only coat inadequately at the boundary surfaces of these domains. Another drawback is a risk of phase separation of the monolayers on metal surfaces if mixtures of different alkylthiols are used. Such de-mixing of the crystalline layer significantly degrades both the mechanical and the optical properties of such a coating. Furthermore the known monomeric alkylthiols are unusually smelly and most often are toxic, restricting professional application of such compounds.

Aside the thiols of low molecular weight, thiol derivatives of oligomeric carbohydrates, for instance cyclodextrin thiols, have been made to chemically adsorb [G. Nelles, M. Weisser, R. Back, P. Wohlfart, G. Wenz, S. Mittler-Neher, *J. Am. Chem.Soc.* 1996, 118, pp 5039–5046]. In this procedure hydrophilic coatings of thicknesses of few nanometers were prepared. However oligomeric and polymeric thiol derivatives incur the drawback to crosslink in solution while forming S—S bonds. Moreover the synthesis of cyclodextrin thiols described to-date has been very expensive and complex.

The patent document WO 88 5473 furthermore describes coating metal surfaces by chemical adsorption of mono- or poly-functional molecules. However none of the described functional groups is a thiol- or a thiolsulfate group. Instead the functional groups described therein contain halogenalkyl groups or unsaturated groups. Use of organic solvents is recommended for any such application.

Therefore it is the objective of the present invention to prepare novel compounds free of objectionable odors, having low toxicity and being substantially more soluble in aqueous media than the heretofore known compounds, and are intended to be amorphous, hydrophilic and tight coatings on metals and offering high mechanical strength and chemical resistance. Moreover such compounds shall allow coating metal surfaces in substantially more ecological, more economical and simpler manner.

This problem is solved by the implementing means stated in the claims. In particular soluble, polymeric thiosulfates are prepared having the structural units of the general formulas I and/or II

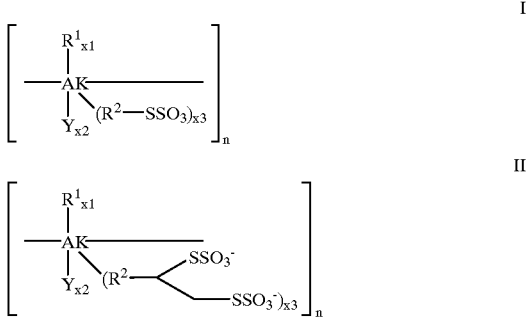

where AK is an anhydro-carbohydrate unit, the residue R$^1$ is a hydrogen atom, a straight-chain or a branched-chain (C$_1$–C$_{30}$) alkyl residue, a straight-chain or a branched-chain (C$_2$–C$_{30}$) alkylenoxyalkyl residue, a straight-chain or a branched-chain (C$_1$–C$_{30}$) alkanoyl residue, a straight-chain or branched-chain (C$_2$–C$_{30}$)alkylenoxoalkyl residue, a (C$_2$–C$_{30}$) alkenyl residue, a (C$_2$–C$_{30}$) alkenoyl residue, a (C$_2$–C$_{30}$) alkinyl residue, a straight-chain or branched-chain (C$_5$–C$_{30}$) cylcoalkyl residue, a substituted or unsubstituted (C$_5$–C$_{30}$) aryl residue possibly with one or more heteroatoms, or a substituted or unsubstituted (C$_5$–C$_{30}$) aryloyl residue possibly having one or several heteroatoms, where the residue R$^1$ each time is bound to an oxygen atom of the anhydro-carbohydrate unit and the degree of substitution x3 is 0, 1, 2 or 3, where the residue R$^2$ is a bivalent spacer selected from a substituted or unsubstituted (C$_1$–C$_{30}$) alkylene residue, a substituted or unsubstituted (C$_1$–C$_{30}$) hydroxyalkylene residue, a substituted or unsubstituted (C$_1$–C$_{30}$) oxoalkylene residue, a substituted or unsubstituted (C$_2$–C$_{30}$) alkylenoxoalkylene residue, a substituted or unsubstituted (C$_2$–C$_{30}$) alkyleneoxyalkylene residue, a substituted or unsubstituted (C$_2$–C$_{30}$) hydroxyalkylenoxyalkylene residue, a substituted or unsubstituted (C$_2$–C$_{30}$) alkylenoxyhydroxyalkylene residue, a (C$_2$–C$_{30}$) alkenyl residue, a substituted or unsubstituted (C$_2$–C$_{30}$) alkinyl residue, a substituted or unsubstituted ($C_5$–$C_{30}$) cylcoalkylene residue or a substituted or unsubstituted ($C_5$–$C_{30}$) arylene residue possibly having one or several heteroatoms, where the residue $R^2$ each time is bound to an oxygen atom of the anhydro-carbohydrate unit and the degree of substitution x3 is 0, 1, 2 or 3, where Y is a functional group selected from a nitrate group, an aminodeoxy group, a substituted or unsubstituted amino group, a carboxyalkyl-, a hydroxyalkyl- group, a sulfate-, a sulfonate- group, a carbonate- or xanthogenate-group, the degree of substitution x2 being 0, 1, 2 or 3, provided that the sum of x1, x2 and x3 be ≦3 and that x3 not be 0 over the entire polymer chain and that n be a degree of polymerization between 1 and 10,000, the coupling of the anhydrocarbohydrate units being linear, cyclic, branched or crosslinked.

Only those carbons are meant in the above stated range of carbon numbers of the particular residues which are not double-bonded to oxygen.

In a preferred implementation of the present invention, the anhydro-carbon unit AK is an anhydroglucose unit.

In case the residues $R^1$ and $R^2$ resp. denote a substituted aryl residue and a substituted aryloyl residue, these residues illustratively may be substituted by one or several halogen atoms, alkyl residues, cycloalkyl residues, mono-, di- or tri-alkylsilyl residues, mono-, di- or tri-arylsilyl residues or trifluoromethyl groups.

Compared with other polymeric sulfur compounds, the polymeric thiosulfates of the invention offer good solubilities in polar solvents, in particular water. Moreover the compounds of the invention will not crosslink in solution. In addition, these polymeric thiosulfates are practically odorless, and, being polymers, they do not penetrate the skin.

Another objective of the invention is to create a method for preparing the polymeric thiosulfates of the invention.

Accordingly, in the invention, tetrathionates are bonded by a polymer-analogous reaction to unsaturated polymers. In a polymer-analogous reaction, there will be addition of alkali- or earth-alkali tetrathiones to unsaturated polymers. Illustratively the unsaturated polymers may be alkenyl- or alkinyl-ethers or -esters of polyols. The unsaturated polymers alkenyl- or alkinyl-ethers or esters of polysaccharides are preferred.

Preferably the polysaccharides are selected from cellulose, starch, amylose, amylopectin, xanthan, guaran, dextran, cyclodextrins, pullulan, carrageen, and other linear, cyclic or branched polyglucans, polygalactans, polymannans and their copolymers. In an especially preferred implementation, the polysaccharide is (3-allyloxy-2-hydroxypropyl)-cellulose or (3-allyloxy-2-hydroxypropyl)-carboxymethylcellulose.

The polymer-analogous addition is carried out in aqueous solution, the reaction taking place at 60–130° C., preferably at 70–100° C.

Accordingly water-soluble polymeric thiosulfates can be prepared by adding tetrathionates to unsaturated polymers. In the process polymers are produced containing at least in part structural units of the above formulas I and/or II (polymeric Bunte salts). Illustratively bis-thiosulfate units of formula II can be synthesized, as shown below in eq. 1, by adding tetrathionate to allyloxy-hydroxypropyl cellulose itself prepared from cellulose and allylglycidylether (AGE):

Cell-OH 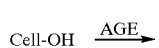 (1)

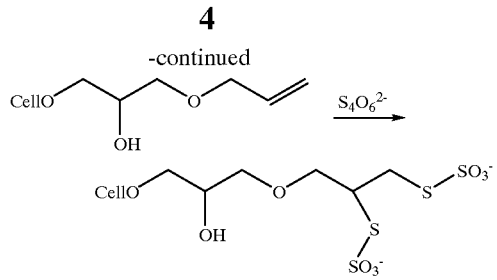

The addition of tetrathionate to the double bonds is carried out without catalyst in aqueous solution. The preparation of other polymeric alkylthiosulfates takes place similarly. For instance the allyl derivatives of cyclodextrin and of cellulose can be transformed into the thiosulfate derivatives using the above preparation procedure. The allyl derivatives are easily accessible by adding allylglycidyl ether to cyclodextrin or cellulose.

The method of the invention to prepare polymeric alkylthiosulfates is characterized by great simplicity and high yield. The products of this preparation method are well water-soluble, and furthermore the polymers are not crosslinked by S—S bridges.

The advantages flowing from these properties regarding the possible uses and application ranges of such compounds are manifold. Illustratively firmly adhering coatings only a few nanometer thick can be deposited onto metals, especially precious metals such as gold and silver and on semi-precious metals such as copper. Such coats can be prepared using the polymeric thiosulfates of the invention in aqueous solution, that is in a solvent which is both ecological, economical and very advantageous for production. Furthermore the polymeric thiosulfates of the invention offer the advantage over monomeric alkylthiols that, during a very quick reaction, they will form very tight hydrophilic as well as amorphous films of significantly well defined thickness (a few nanometers) on metal surfaces. Compared to conventional coating procedures, the coating of the invention offers the advantage of being very simply implemented industrially and also being practical for bodies of arbitrary shape (for instance the insides of pipes/tubes). The monolayers so obtained are characterized by high mechanical strength and by being highly hydrophilic. This circumstance can be utilized to achieve substantially improve adhesion of conventional and commercial bonding agents and varnishes/ enamels on metal surfaces. It is further known that the body's proteins and molecules responsible for thrombocyte accretion do not, or only very slightly, deposit on hydrophilic surfaces. Therefore good bio-compatibility of these coatings is to be expected. In addition, colloidal particles can be stabilized. Preferably the colloidally dissolved metal will be gold, silver, palladium, platinum, mercury or copper. However the applicability of the polymeric thiosulfates is not solely restricted to metal surface, but may also be extended to any other cationized and/or amino-containing surface. Illustratively such surfaces may be polymer surfaces—for instance those of plastic implants.

The resulting possible applications of the new molecule are listed below:

(a) preventing corrosion and oxidation of precious metals, for instance silver (blackening), semi-precious metals, for instance copper (verdigris), nickel; preservation for instance of collector coins, spectacle frames, jewelry, (b) improving wettability of metal surfaces, (c) improving adhesion of bonding agents, varnishes/ enamels and compound materials at metal surfaces, (d) stabilizing metal colloids, illustratively the polymeric Bunte salts acting as; protective colloids, (e) release of pharmaceutically active ingredients (for instance inflammation inhibitors) included in the metal surfaces coated by the method of the invention with cyclodextrins or amylose, (f) increasing bio-compatibility (for instance reducing blood clotting and allergies), treating metal surfaces for medical applications (surgical instruments such as microtools, stents, endo-prostheses such as heart valves, joint sockets, screws, sensors, minimally invasive galvanized plastics etc.), (g) improving coupling of protein molecules (for instance enzymes antibodies, antigens) to metal surfaces and metal colloids, (h) producing nano-structured polymer surfaces by selective adsorption of the polymeric Bunte salts at metal patterns (for instance nano-structured gold patterns on silicon surfaces), (I) immobilizing metal colloid particles on solid surfaces, (j) sealing metal surfaces to prevent contact allergies, for instance nickel allergy, (k) base coating to deposit other polymers, for instance proteins, especially antibodies; use of multilayers based on the coating of the inventions for use in medical diagnostics.

Layers built from the compounds of the invention are formed within minutes. Furthermore the layers form in amorphous and extremely tight, and are mechanically strong even at minute layer thicknesses. Also such a coating can be functionally extended and chemically changed.

The layers of the invention can be used as a lasting and firmly adhering platform for multi-layer coatings (for instance for surface refining or bonding proteins).

Figure 6:
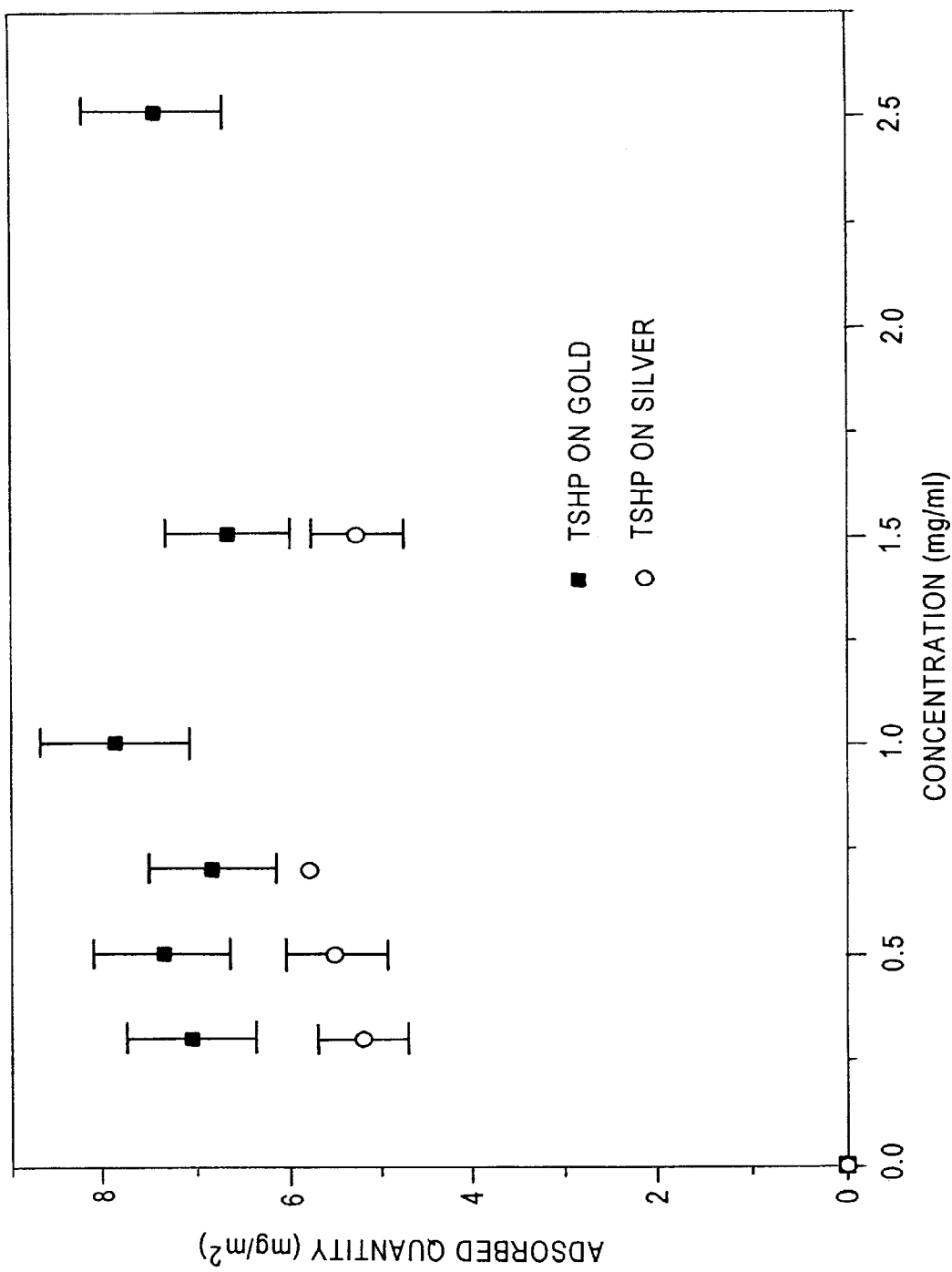

FIG. 1 diagrammatically shows structural units that may be present in a polymeric thiosulfate of the invention according to Example 1, FIG. 2 shows spectra of (3-allyloxy-2-hydroxypropyl)-cellulose, [a]: $^1$H-NMR and [b]: $^{15}$C-DEPT-NMR, FIG. 3 shows spectra, [a]: of (3-thiosulfatopropyl-oxy-2-hydroxypropyl) cellulose powder and [b]: of $^{13}$ C-DEPT-NMR, FIG. 4 shows FT-IR spectra of [a]: (3-thiosulfatopropyl-oxy-2-hydroxypropyl-cellulose powder and [b]: of an ultrathin film of (3-thiosulfatopropyl-oxy-2-hydroxypropyl)-cellulose on gold, FIG. 5 shows XPS measurements of (3-thiosulfatopropyl-oxy-2-hydroxypropyl)-cellulose on [a]: a silicon wafer and [b]: on a gold surface, FIG. 6 shows adsorption isotherms of TSHP cellulose at room temperature on [a]: gold and [b]: silver.

The present invention is elucidated by the following Examples.

EXAMPLE 1

Synthesis of (3-thiosulfatopropyl-oxy-2-hydroxypropyl)-cellulose, Hereafter TSPH Cellulose First, cellulose is converted into (3-allyloxy-2-hydroxypropyl) cellulose. The TSHP cellulose is prepared in a second step by addition reaction of tetrathionate to the allyl group; see FIG. 1.

[a] preparing (3-allyloxy-2-hydroxypropyl) cellulose 5.0 g [30.7 mmol] of microcrystalline cellulose are stirred for 48 h in 90 ml of 25% NaOH solution and then are diluted with another 90 ml water. Next 35.4 g (310 mmol) of allylglycidylether [Aldrich] are added and stirring proceeds for 2 h at room temperature and thereupon 6 more days at 60° C. After cooling, this solution is neutralized with conc. hydrochloric acid. The aqueous solution is purified by continuous filtration against a UF-PA-5 membrane [Hoechst-Kalle] until 1,000 ml of permeate are obtained. The retained material is freeze-dried. The yield is 3.15 g (79.5%) of a white solid.

Figure 2A:
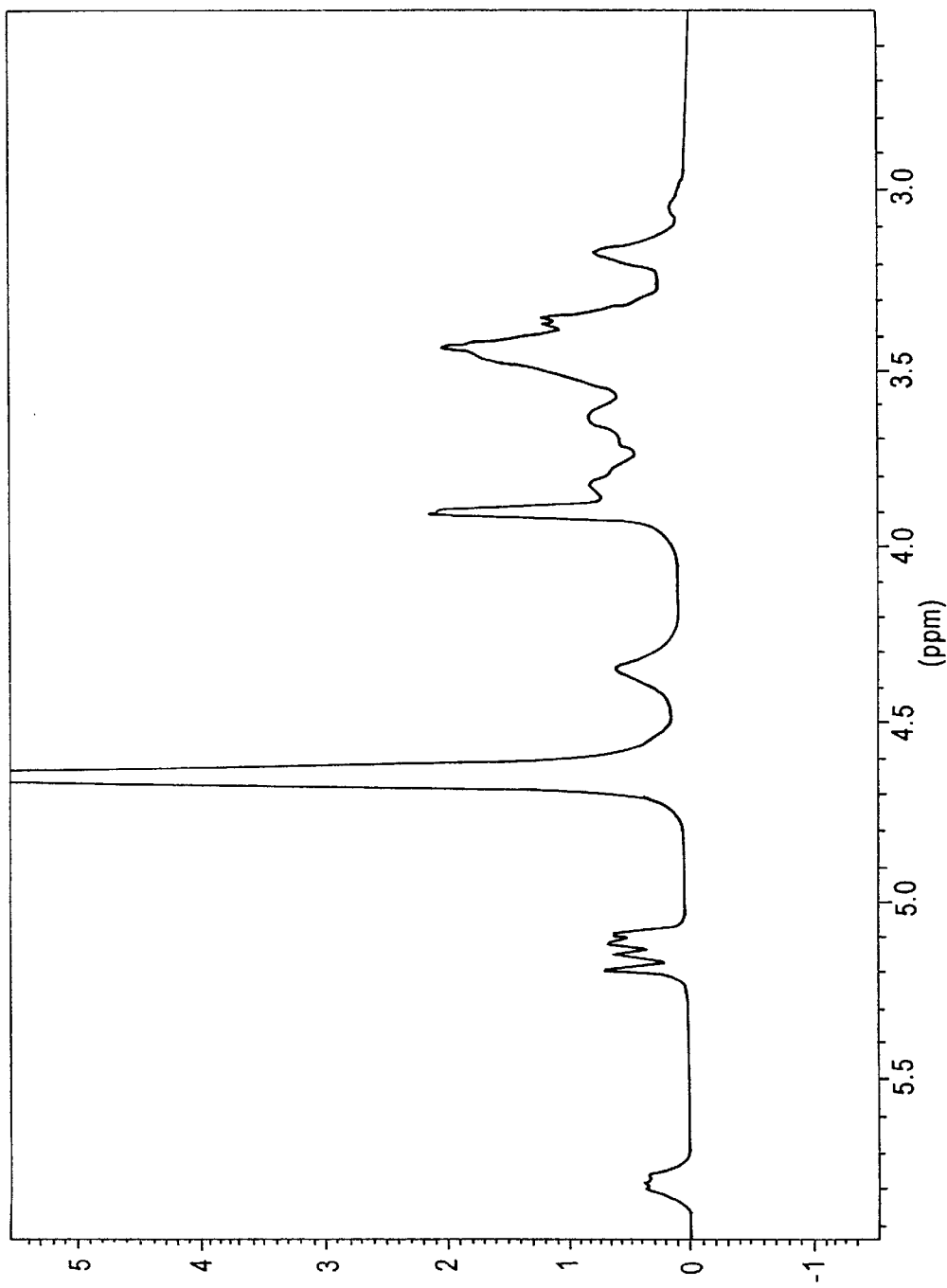

Proof of structure: $^1$H-NMR (D$_2$O): δ=5.76 (m, 1H, H-e), 5.08–5.20 (m, 2H, H-f), 4.34 (s, 1H, C-1), 3.89 (s, H-d), 3.82 (m, 2H, H-5, H-4), 3.45–3.17 (m, 9H, H-a, H-b, H-c, H-3,2 H-6); FIG. 2a.

Figure 2B:
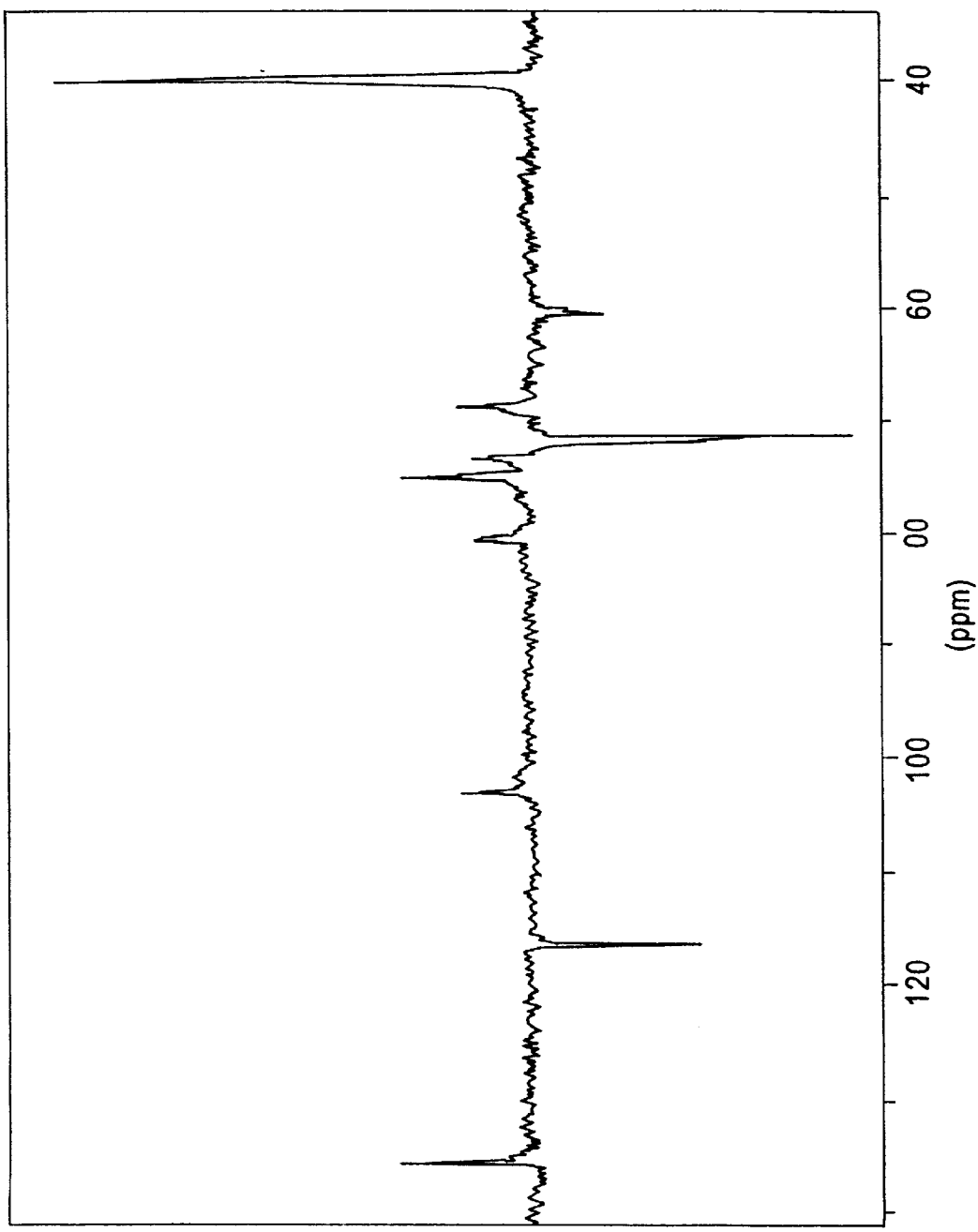

$^{13}$C-DEPT-NMR (DMSO-d$_6$) : δ=135.3 (C-e), 116.3 (C-f), 102.8 (C-1), 80.3 (C-4), 74.7 (C-3, C-5, C-2), 73.0–71.7 (C-a, C-d, C-c), 68.5 (C-b), 60.2 (C-6); FIG. 2b.

IR: 3399s, 2871s, 1644m, 1419w, 1369w, 1316w, 1250w, 1066s, 932 w cm$^{-1}$.

Ultimate analysis: computed for {[C$_6$H$_{10}$O$_5$]$_{0.5}$ [C$_{12}$H$_{20}$O$_7$]$_{0.7}$}(n=200) C: 43.48; H: 7.66; measured: C: 43.39; H: 6.46

[b] Synthesis of (3-thiosulfatopropyl-oxy-2-hydroxypropyl) cellulose, hereafter TSHP cellulose 1 g (7.75 mmol) of (3-allyloxy-2-hydroxypropyl) cellulose prepared as above and 3.18 g of potassium tetrathionate [Aldrich] are agitated in 100 ml H$_2$O and heated with reflux to 100° C. After 2 days the yellowish solution is cooled and filtered through a nylon filter with a pore width of 0.45μ. The filtrate is purified by continuous ultrafiltration against a UF-PA 5 membrane [Hoechst-Kalle] until there are 1,000 ml of permeate. The retained material is freeze-dried. The yield is 0.44 g (34.1%) of a white solid.

Figure 3A:
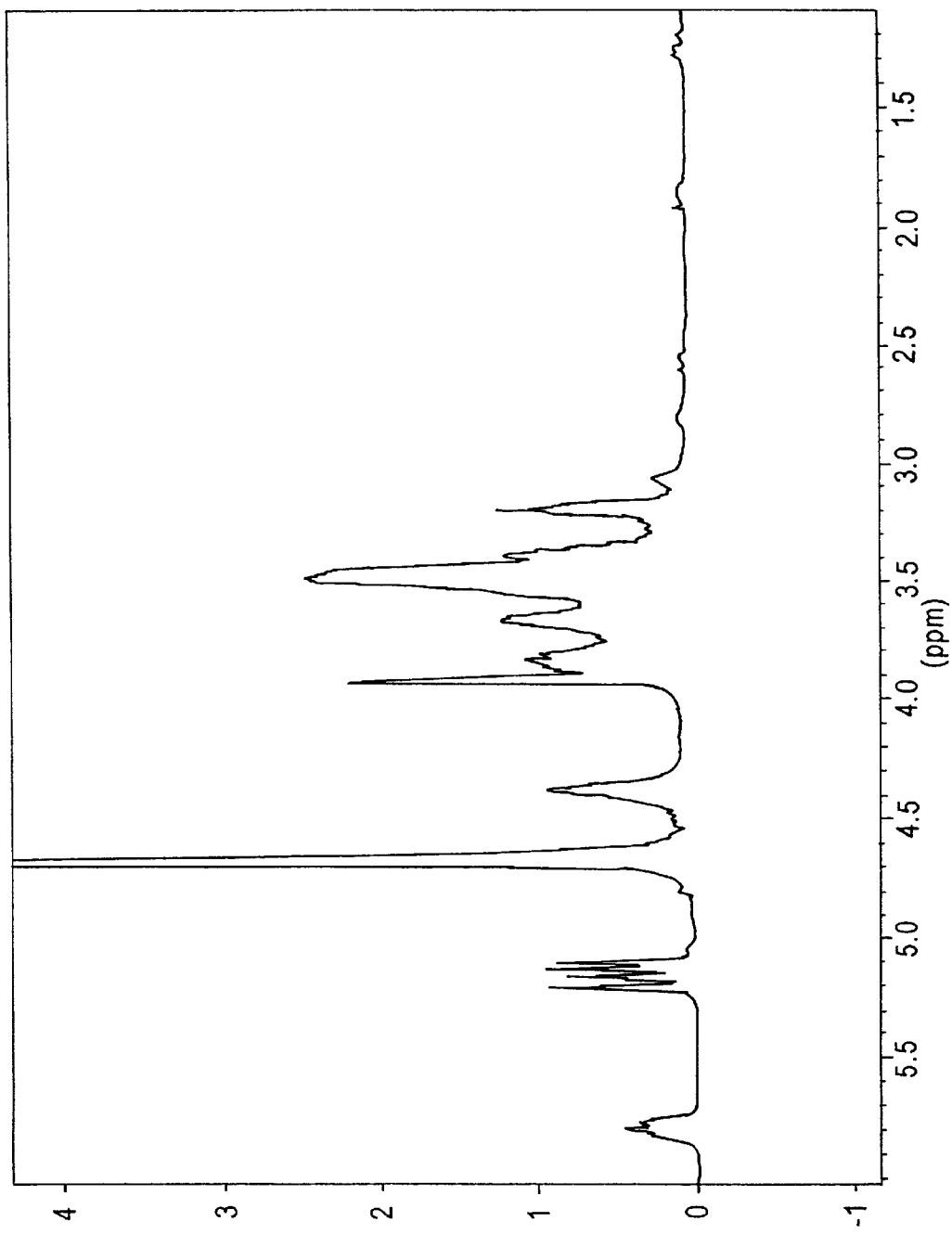

Proof of structure: $^1$H-NMR (D$_2$O): δ=5.76 (m, 1H, H-e), 5.08–5.20 (m, 2H, H-f), 4.34 (s, 1H, C-1), 3.89 (s, H-d), 3.8 (m, 2H, H-5, H-4), 3.45–3.17 (m, 9H, H-a, H-b, H-c, H-3, H-2, H-6), 1.91 (m, 1H, H-f*), 1.28 (m, 1H, H-e*); FIG. 3a.

Figure 3B:
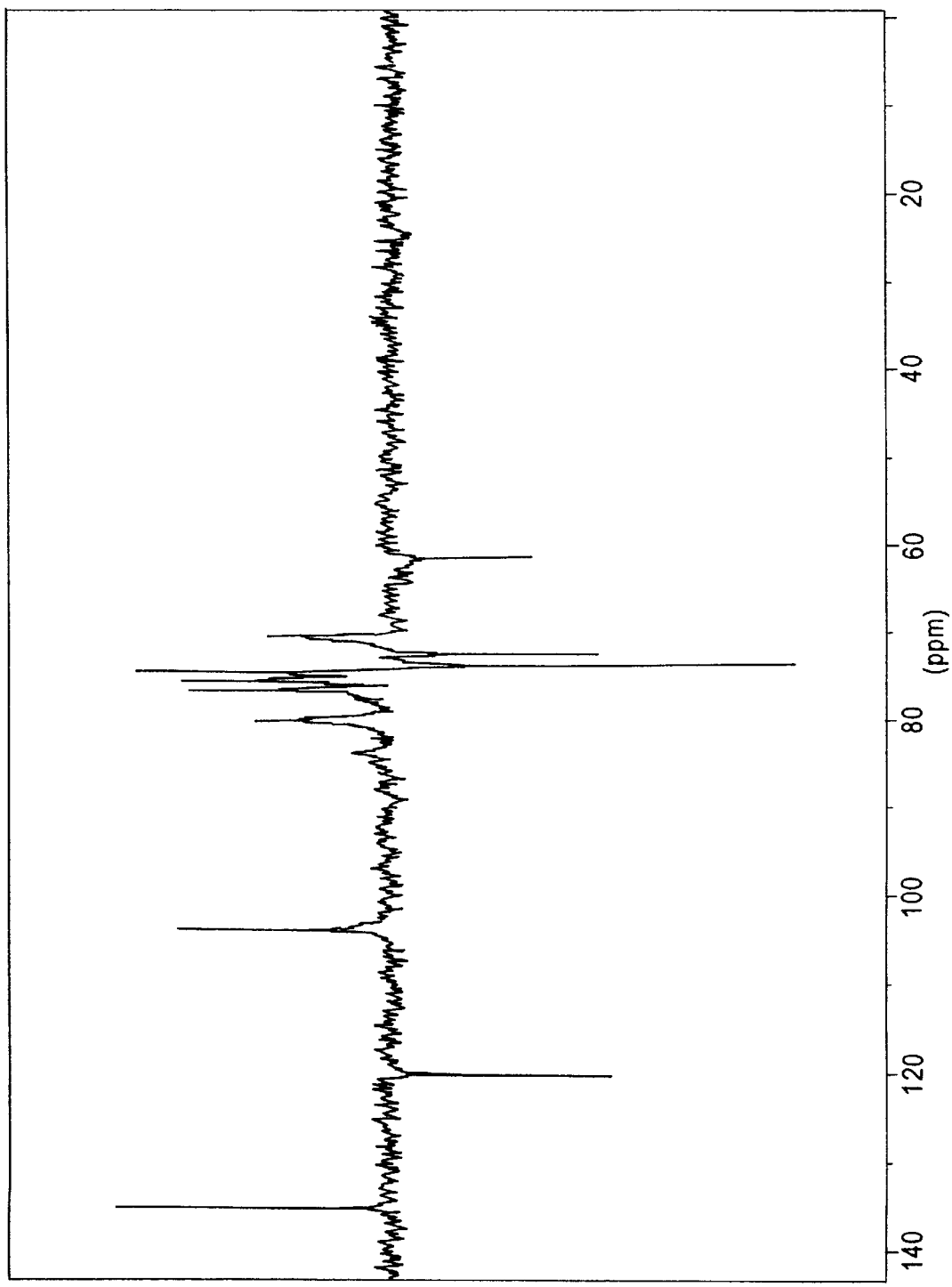

$^{13}$C-DEPT-NMR (DMSO-d$_5$): δ 135.3 (C-a*), 116.3 (C-f*), 102.8 (C-1), 80.3 (C-4), 74.7 (C-3, C-5, C-2), 73.0–71.7 (C-a, C-d, C-c), 68.5 (C-b), 60.2, (C-6; FIG. 3b,

Proof of structure: $^1$H-NMR (D$_2$O): δ=5.76 (m, 1H, H-e), 5.08–5.20 (m, 2H, H-f), 4.34 (s, 1H, C-1), 3.90 (s, 2H, —CH$_2$—), 3.89 (s, H-d), 3.82 (m, 2H, H-5, H-4), 3.45–3.17 (m, 9H, H-a, H-b, H-c, H-3, H-2, H-6).

$^{13}$C-DEPT-NMR (D$_2$O): δ=177.4 (C=0), 136.7 (C-e), 121.1 (C-f), 104.4 (C-1), 85.6 (C-2), 81.7 (C-4), 75.8 (C-a, C-d, C-c), 78.6 (C-5), 73.9 (—CH$_2$—), 77.3 (C-3, C-b), 72.3 (C-g), 65.9 (C-f), 63.6 (C-6).

IR: 3271s, 2884s, 1729s, 1596m, 1426w, 1325w, 1192w, 1062w, 932w, 615m cm$^{-1}$.

The basic effect of the compound acting as a coating material is elucidated below and several Examples are given.

Because taking place from an aqueous solution, coating by means of the polymeric thiosulfates is very simple. The metal surfaces are immersed into an aqueous solution for instance of TSHP cellulose for a few minutes, or are sprayed with it (Example 3). This method also is suitable for curved surfaces otherwise of difficult access (for instance hoses, pipes/tubes). The layer thicknesses so produced (4.0 to 5.0 nm range) are well reproducible and can be accurately controlled. Tight layers of reproducible thickness are obtained already at very low concentrations. The polymeric thiosulfate adheres very well to the metal surfaces. Layer stability can be enhanced further by subsequent coating with a polycation because the polyelectrolyte interaction entails physical crosslinking.

The following assumptions plausible explain this coating procedure.

First the S—S bond of the thiosulfonate groups is homolytically split while forming radicals of thiol-S. and sulfite- .$SO_3$. The metal (Me)—preferably gold—is oxidized by the thiol radical, creating the S—(Me) bond (eq. 2). Probably the sulfite radical .$SO_3$ dimerizes into dithionite (eq. 3),

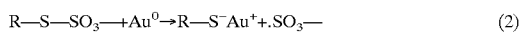

$$R—S—SO_3—+Au^0 \rightarrow R—S^-Au^+ + .SO_3— \qquad (2)$$

$$2.SO_3— \rightarrow S_2O_3^{2-} \qquad (3).$$

Figure 4A:
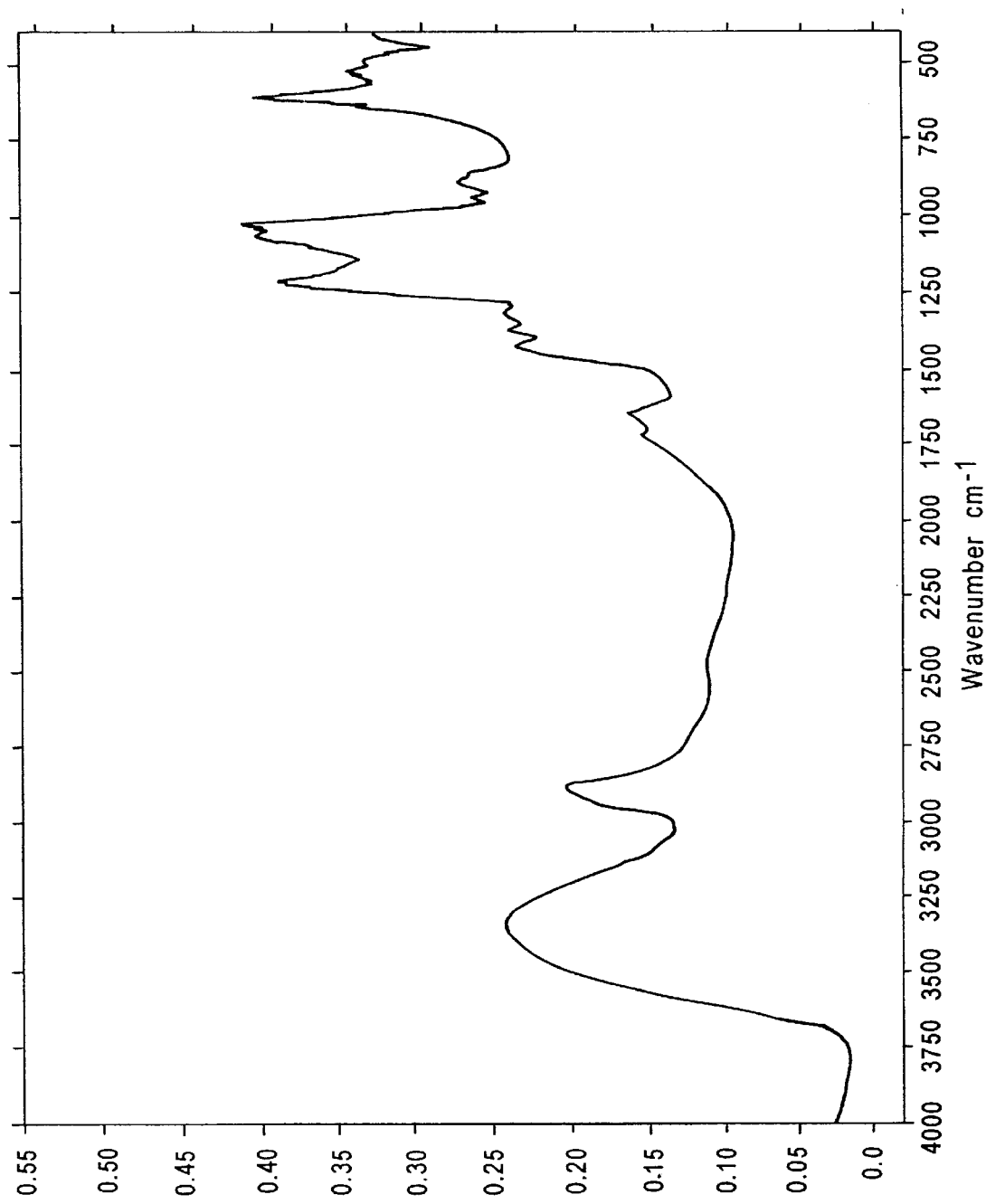
Figure 4B:
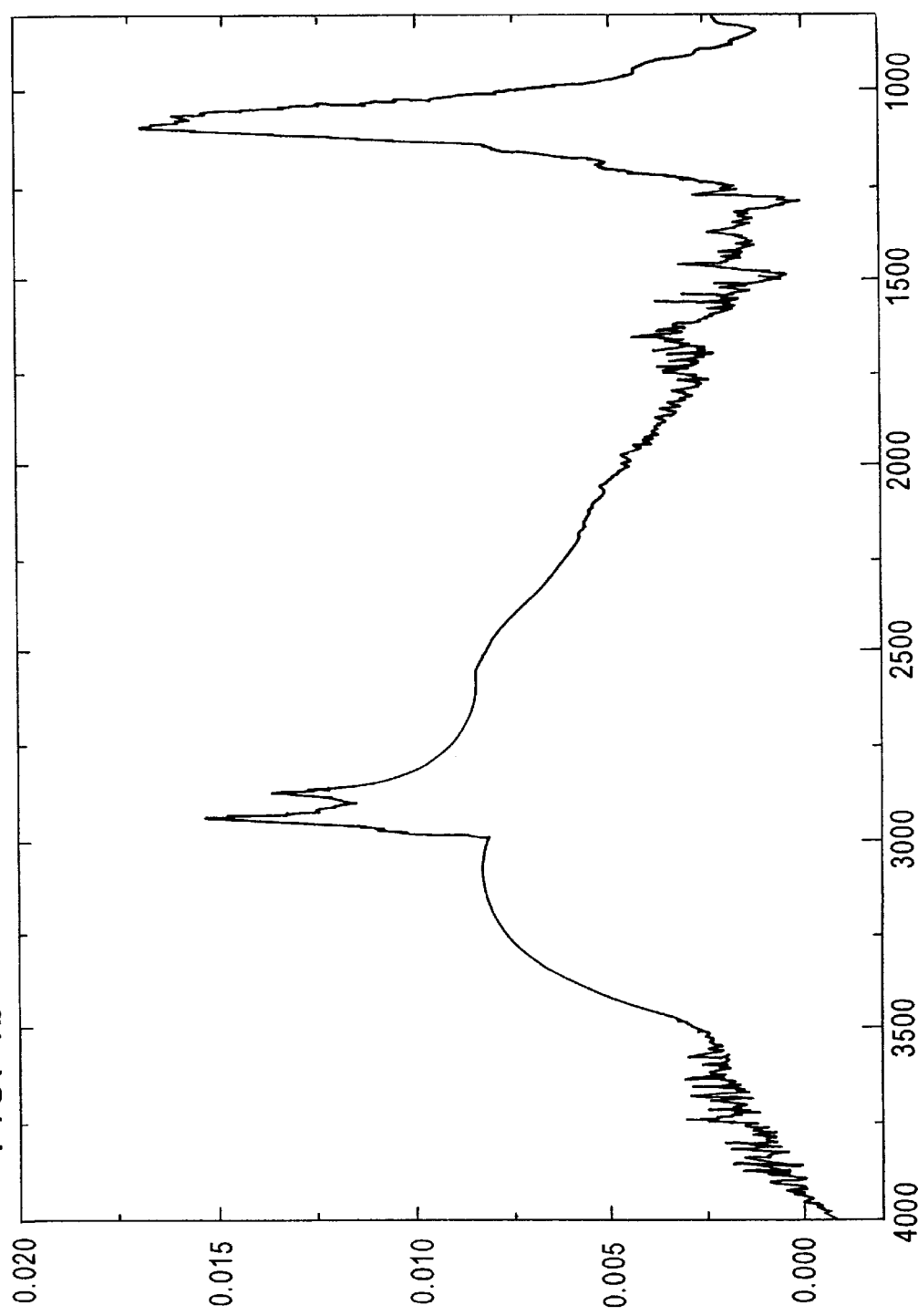

IR: 3399s, 2871s, 1644m, 1419w, 1369w, 1250w, 1198m, 1017 m, 932w, 601s, 408m $cm^{-1}$; FIG. 4a.

Ultimate analysis: computed for $\{[C_5H_{10}O_5]_{0.3}[C_{12}H_{18}O_{13}S_7]_{0.1}[C_{12}H_{20})O_7]_{0.6}\}$; (n=200); C: 42.65; H: 6.72; S: 4.35; measured: C: 41.1; H: 6.35; S: 4.57.

The polymer-bound thiosulfate groups are detected by the characteristic IR bands (1250, 1017 and 601 $cm^{-1}$), by ultimate analysis and by XPS tests (FIG. 5).

EXAMPLE 2

Synthesis of (3-thiosulfatopropyl-oxy-2-hydroxypropyl-carboxy-methyl) Cellulose, Herein TSHP-CMC

[a] Synthesis of (3-allyloxy-2-hydroxypropyl) carboxymethyl cellulose 1.0 g (4.13 mmol) of carboxymethyl cellulose (MW 250,000; DS=0.9) is dissolved in 10 ml of 25% NaOH solution and diluted with 30 ml $H_2O$. After 4 h, 9.62 g (84.3 mmol) of allylglycidylether [Aldrich] are added and the mixture is agitated for 2 h at room temperature and thereupon for 3 days at 60° C. Following cooling, the aqueous solution is purified by continuous ultra-filtration against a UF-PA 5 [Hoechst-Kalle] membrane until obtaining 1,000 ml of permeate. The retained material is freeze dried. The yield is 1.4 g (50%) of a white solid.

Proof of structure: $^1$H-NMR ($D_2O$): δ=5.76 (m, 1H, H-e), 5.08–5.20 (m, 2H, H-f), 4.34 (s, 1H, C-1), 3.90 (2, 2H, —$CH_2$—), 3.89 (s, H-d), 3.82 (m, 2H, H-5, H-4), 3.45–3.17 (m, 9H, H-a, H-b, H-c, H-3, H-2, H-6).

$^{13}$C-DEPT-NMR ($D_2$)); δ=177.4 (C=0), 136.7 (C-e), 121.1 (C-f), 104.4 (C-1), 84.4 (C-2), 80.6 (C-4), 75.8 (C-a, C-d, C-c), 74.7 (C-5), 73.9 (—$CH_2$—), 71.7 (C-3, C-b), 65.9 (C-6).

IR: 3271s, 2884s, 1729s, 1596m, 1426w, 1325w, 1250–950w, 932w $cm^{-1}$.

[b] Synthesis of TSHP-CMC 0.2 g (0.6 mmol) of (3-alloxyl-2-hydroxypropyl) carboxymethyl cellulose are agitated in 90 ml $H_2O$. After 2 h, 1.190 g (3.94 mmol) of potassium tetrathionate dissolved in 20 ml $H_2O$ are added and the mixture is then heated with reflux to 90° C. After 2 days the yellowish solution is cooled and filtered. The filtrate is purified by continuous ultrafiltration against a UF-PA 5 membrane [Hoechst-Kalle] until 1,000 ml of permeate are obtained. The retained material is freeze dried. The yield is 0.67 g (45%) of a white solid.

This mechanism is corroborated by XPS measurements (FIG. 5). Whereas (3-thiosulfatopropyl-oxy-2-hydroxypropyl) cellulose on silicon (FIG. 5a) displays signals at 163.5 ev for sulfide and at 168.5 ev for sulfonate, (3-thiosulfatopropyl-oxy-2-hydroxypropyl) cellulose on gold (FIG. 5b) only displays one signal at 162.5 ev for sulfide. The chemical adsorption is irreversible. Following coating, the coated samples can be placed in pure water without incurring desorption of (3-thiosulfatopropyl-oxy-2-hydroxypropyl) cellulose.

EXAMPLE 3

Coating Gold with TSHP

The substrates were made of planar glass or silicon, with gold evaporated on them (heat evaporation coating at $-4 \times 10^{-5}$ mbars. On the average the gold layers were 500 Å thick. The substrates are immersed into a 0.1% by wt aqueous solution of TSHP cellulose (prepared as in Example 1) at room temperature and are left standing for one hour. Thereupon they are rinsed several times in water and dried in a flow of $N_2$.

Following coating of the gold substrates with TSHP, the advancing or receding angle of contact (A. Adamson, *Physical Chemistry of Surfaces*, 4th ed., John Wiley and sons, New York 1982) resp. of 50°±3° and 16°±2° is measured for water drops. The uncoated gold substrate evinces an advancing and receding contact angle for water drops resp. of 90°±2° and 55°±2°.

The adsorption behavior of TSHP cellulose from aqueous solution onto gold surfaces was investigated for various times of adsorption and initial concentrations (0.2–3.0 mg/ml); see FIG. 6a. The layer thicknesses of substrates which were immersed for 5 minutes as well as for 24 h in the aqueous solution of TSHP cellulose show similar values. The layer thickness of the chemically adsorbed TSHP cellulose on gold was determined in air using null ellipsometry [R. M. Azzam, N. M. Bashara, *Ellipsometry and Polarized Light:* North Holland Publication, Amsterdam, 1979]. Its average is 4.5±0.5 nm. The quantity adsorbed was computed by the product of layer thickness times density. The density of TSPH cellulose was assumed being 1.5 g/$cm^3$ [J Brandrup; E. H. Immergut, *Polymer Handbook*, 3rd ed. John Wiley and Sons, New York, 1989].

The chemical adsorption of TSHP cellulose on gold surfaces was measured by FT-IR. Thin TSHP cellulose layers on gold and TSHP cellulose powder show the same characteristic absorption bands, namely in the frequency range of 3400–3200 $cm^{-1}$ (OH group), 2930–2850 $cm^{-1}$ (CH—, $CH_2$ groups), 1374 $cm^{-1}$ (C—OH— group), 1250–1500 $cm^{-1}$ (CH—, C—O—C groups) and 1199 $cm^{-1}$ (C—C group); see FIG. 4b.

EXAMPLE 4

Coating TSHP Cellulose Layers on Gold with Proteins

TSHP cellulose layers on gold of Example 2 are immersed for 24 h in an aqueous solution of bovine serum albumin (BSA) or fibrinogen (concentration: 1.0 mg/ml) at 25°. Thereupon the samples are rinsed with water and dried. An increase in the layer thickness of 0.4 nm for BSA and 1.4 nm for fibrinogen was measured using null ellipsometry. These layer thicknesses are minute compared to other materials such as glass or hydrophobed glass [M. Malmstrem, *J. Colloid Interface Sci.*, 1994, 166, pp 333–342].

EXAMPLE 5

Coating Silver Surfaces with TSHP Cellulose

The substrates used are made by evaporating silver (heat evaporation at $-4 \times 10^{-6}$ mbar) onto planar silicon substrates. The Ag layers were 500 Å thick on the average. The substrates are immersed into an aqueous solution of TSHP cellulose (prepared as in Example 1) at room temperature and left standing for an hour. Thereupon they are rinsed several times with water and dried in a flow of $N_2$. To check the surface tightness, the coated silicon substrates are exposed for 11 h at room temperature together with a comparison probe to an atmosphere of hydrogen sulfide. It was found that the substrates coated with the polymeric thiosulfates of the invention did not discolor at all.

The adsorption behavior of TSHP cellulose from aqueous solutions at silver surfaces was investigated for different times of adsorption and for different initial concentrations (0.2–3.0 mg/ml); see FIG. 6b. The layer thickness of the chemically adsorbed TSHP cellulose on silver was determined in air using null ellipsometry [R. M. Azzam, N. M. Bashara, *Ellipsometry and Polarized Light;* North Holland Publication, Amsterdam, 1979]. On the average it is 4.0±0.5 nm. The quantity adsorbed was determined from the product of layer thickness times density. The density of TSHP was assumed 1.5 g/cm$^3$ [J. Brandrup; E. H. Immergut, *Polymer Handbook,* 3rd ed. John Wiley and sons, New York, 1989].

EXAMPLE 6

Coating Gold Surfaces with TSHP-CMC

A gold layer 500 Å thick was heat-evaporated onto an Si wafer (4.0×10$^{-5}$ mbar) and immersed into an aqueous solution of TSHP-CMC (prepared as in Example 5). Regardless of the initial concentration (0.2–2.0 mg/ml) of the TSHP-CMC, the layer thickness of the chemical adsorbed TSHP-CMC on gold on the average is 3.0±0.5 nm as determined by null ellipsometry [R. M. Azzam, N. M. Bashara, *Ellipsometry and Polarized Light;* North Holland Publication, Amsterdam, 1979].

The advancing or receding contact angle [A. Adamson, *Physical Chemistry of Surfaces,* 4th ed., John Wiley and Sons, New York 1982] was resp. 40°±3° and 15°±2°, measured for water drops. The uncoated gold substrate evinces an advancing or receding contact angle of 90°±2° and 55°±2° resp. for water drops.

What is claimed is:

1. A soluble polymeric thiosulfate having formula I or II

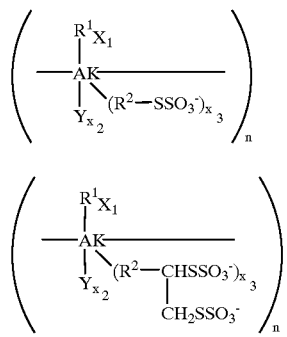

wherein
AK is an anhydro-carbohydrate unit,
the residue R$^1$ is a hydrogen atom, a straight-chain or a branched-chain (C$_1$–C$_{30}$) alkyl residue, a straight-chain or a branched chain (C$_1$–C$_{30}$) alkanoyl residue, a straight-chain or a branched-chain (C$_2$–C$_{30}$) alkyleneoxyalkyl residue, a straight-chain or a branched-chain (C$_2$–C$_{30}$) alkyleneoxoalkyl residue, a (C$_2$–C$_{30}$) alkenyl residue, a (C$_2$–C$_{30}$) alkenoyl residue, a (C$_2$–C$_{30}$) alkynyl residue, a straight-chain or a branched-chain (C$_5$–C$_{30}$) cylcoalkyl residue, a substituted or unsubstituted (C$_5$–C$_{30}$) aryl residue which may have one or several heteroatoms, or a substituted or unsubstituted (C$_5$–C$_{30}$) aryloyl residue which may have one or more heteroatoms, where the residue R$^1$ is bonded in each case to an oxygen atom of the anhydro-carbohydrate unit and the degree of substitution x1 is 0, 1, 2, or 3, the residue R$^2$ is a bivalent spacer selected from a substituted or unsubstituted (C$_1$–C$_{30}$) alkylene residue, a substituted or unsubstituted (C$_1$–C$_{30}$) hydroxyalkylene residue, a substituted or unsubstituted (C$_1$–C$_{30}$) oxoalkylene residue, a substituted or unsubstituted (C$_2$–C$_{30}$) alkyleneoxoalkylene residue, a substituted or unsubstituted (C$_2$–C$_{30}$) alkyleneoxyalkylene residue, a substituted or unsubstituted (C$_2$–C$_{30}$) hydroxyalkyleneoxyalkylene residue, a substituted or unsubstituted (C$_2$–C$_{30}$) alkyleneoxyhydroxyalkylene residue, a (C$_2$–C$_{30}$) alkenyl residue, a (C$_2$–C$_{30}$) alkyhyl residue, a substituted or unsubstituted (C$_5$–C$_{30}$) cylcoalkylene residue or a substituted or unsubstituted (C$_5$–C$_{30}$) arylene residue which may have one or several heteroatoms, where the residue R$^2$ in each case is bonded to an oxygen atom of the anhydro-carbohydrate unit and the degree of substitution x3 is 0, 1, 2 or 3, Y is a functional group selected from a nitrate-, an aminodesoxy-, a substituted or unsubstituted amino-, a carboxyalkyl-, a hydroxyalkyl-, a sulfonate-, a sulfate-, a carbonate- or a xanthogenate-group, where the degree of substitution x2 is 0, 1, 2 or 3, provided that the sum of x1, x2 and x3 be less than 3 and that x3 shall not be zero over the entire polymer chain, and where n denotes a degree of polymerization between 1 and 10,000, the linkage of the anhydro-carbohydrate units being linear, cyclic, branched or crosslinked.

2. The soluble polymeric thiosulfate of claim 1, wherein the anhydrocarbohydrate unit AK denotes an anhydroglucose unit.

3. The soluble polymeric thiosulfate of claim 1, wherein the polymeric thiosulfate is (3-thiosulfatopropyl-oxy-2-hydroxypropyl)-cellulose.

4. A coating comprising the polymeric thiosulfate of claim 1.

5. The coating of claim 4 on a nanostructured surface of a metal.

6. The coating of claim 4 on a polymeric surface.

7. The coating of claim 6, wherein the surface of the polymer is a cationic or an amino-containing surface.

8. The coating of claim 4 further comprising a protein, enzyme, antibody, antigen, pharmaceutically active ingredient or radioactive isotope.

9. The coating of claim 4 on a surface of a metal.

10. The coating of claim 9, wherein the metal comprises a precious or semiprecious metal.

11. A coating comprising a soluble polymeric thiosulfate having formula I or II

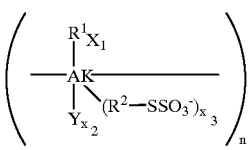

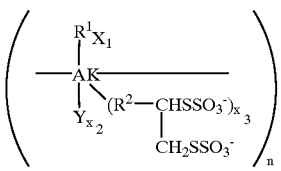

wherein
AK is an anhydro-carbohydrate unit,
R$^1$ is a hydrogen atom, a straight-chain or a branched-chain (C$_1$–C$_{30}$) alkyl residue, a straight-chain or a branched chain ($C_1$–$C_{30}$) alkanoyl residue, a straight-chain or a branched-chain ($C_2$–$C_{30}$) alkyleneoxyalkyl residue, a straight-chain or a branched-chain ($C_2$–$C_{30}$) alkyleneoxoalkyl residue, a ($C_2$–$C_{30}$) alkenyl residue, a ($C_2$–$C_{30}$) alkenoyl residue, a ($C_2$–$C_{30}$) alkynyl residue, a straight-chain or a branched-chain ($C_5$–$C_{30}$) cylcoalkyl residue, a substituted or unsubstituted ($C_5$–$C_{30}$) aryl residue which may have one or several heteroatoms, or a substituted or unsubstituted ($C_5$–$C_{30}$) aryloyl residue which may have one or more heteroatoms, where the residue $R^1$ is bonded in each case to an oxygen atom of the anhydro-carbohydrate unit and the degree of substitution x1 is 0, 1, 2, or 3, $R^2$ is a bivalent spacer selected from a substituted or unsubstituted ($C_1$–$C_{30}$) alkylene residue, a substituted or unsubstituted ($C_1$–$C_{30}$) hydroxyalkylene residue, a substituted or unsubstituted ($C_1$–$C_{30}$) oxoalkylene residue, a substituted or unsubstituted ($C_2$–$C_{30}$) alkyleneoxoalkylene residue, a substituted or unsubstituted ($C_2$–$C_{30}$) alkyleneoxyalkylene residue, a substituted or unsubstituted ($C_2$–$C_{30}$) hydroxyalkyleneoxyalkylene residue, a substituted or unsubstituted ($C_2$–$C_{30}$) alkyleneoxyhydroxyalkylene residue, a ($C_2$–$C_{30}$) alkenyl residue, a ($C_2$–$C_{30}$) alkynyl residue, a substituted or unsubstituted ($C_5$–$C_{30}$) cylcoalkylene residue or a substituted or unsubstituted ($C_5$–$C_{30}$) arylene residue which may have one or several heteroatoms, where the residue $R^2$ in each case is bonded to an oxygen atom of the anhydro-carbohydrate unit and the degree of substitution x3 is 0, 1, 2 or 3, Y is a functional group selected from a nitrate-, an aminodesoxy-, a substituted or unsubstituted amino-, a carboxyalkyl-, a hydroxyalkyl-, a sulfonate-, a sulfate-, a carbonate- or a xanthogenate-group, where the degree of substitution x2 is 0, 1, 2 or 3, provided that the sum of x1, x2 and x3 is less than 3 and that x3 shall not be zero over the entire polymer chain, and where n denotes a degree of polymerization between 1 and 10,000, the linkage of the anhydro-carbohydrate units being linear, cyclic, branched or crosslinked, formed by immersing a substrate comprising a metal in an aqueous or alcoholic solution comprising the polymeric thiosulfate.

12. The coating of claim 11, wherein the anhydro-carbohydrate unit AK denotes an anhydroglucose unit.

13. The coating of claim 11, wherein the polymeric thiosulfate is (3-thiosulfatopropyl-oxy-2-hydroxypropyl)-cellulose.

14. The coating of claim 11, wherein the substrate has nano-structured elements.

15. The coating of claim 11, wherein the metal comprises a metal alloy, a precious metal or a semiprecious metal.

16. The coating of claim 15, wherein the precious metal is gold or silver.

17. The coating of claim 11, further comprising a protein, enzyme, antibody, antigen, pharmaceutically active ingredient or radioactive isotope.

18. A coated substrate comprising the substrate, a metal layer on the substrate and a coating on the metal layer, wherein the coating comprises a soluble polymeric thiosulfate having formula I or II

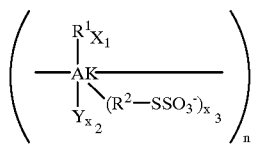

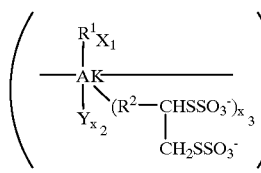

wherein

AK is an anhydro-carbohydrate unit, $R^1$ is a hydrogen atom, a straight-chain or a branched-chain ($C_1$–$C_{30}$) alkyl residue, a straight-chain or a branched chain ($C_1$–$C_{30}$) alkanoyl residue, a straight-chain or a branched-chain ($C_2$–$C_{30}$) alkyleneoxyalkyl residue, a straight-chain or a branched-chain ($C_2$–$C_{30}$) alkyleneoxoalkyl residue, a ($C_2$–$C_{30}$) alkenyl residue, a ($C_2$–$C_{30}$) alkenoyl residue, a ($C_2$–$C_{30}$) alkynyl residue, a straight-chain or a branched-chain ($C_5$–$C_{30}$) cylcoalkyl residue, a substituted or unsubstituted ($C_5$–$C_{30}$) aryl residue which may have one or several heteroatoms, or a substituted or unsubstituted ($C_5$–$C_{30}$) aryloyl residue which may have one or more heteroatoms, where the residue $R^1$ is bonded in each case to an oxygen atom of the anhydro-carbohydrate unit and the degree of substitution x1 is 0, 1, 2, or 3, $R^2$ is a bivalent spacer selected from a substituted or unsubstituted ($C_1$–$C_{30}$) alkylene residue, a substituted or unsubstituted ($C_1$–$C_{30}$) hydroxyalkylene residue, a substituted or unsubstituted ($C_1$–$C_{30}$) oxoalkylene residue, a substituted or unsubstituted ($C_2$–$C_{30}$) alkyleneoxoalkylene residue, a substituted or unsubstituted ($C_2$–$C_{30}$) alkyleneoxyalkylene residue, a substituted or unsubstituted ($C_2$–$C_{30}$) hydroxyalkyleneoxyalkylene residue, a substituted or unsubstituted ($C_2$–$C_{30}$) alkyleneoxyhydroxyalkylene residue, a ($C_2$–$C_{30}$) alkenyl residue, a ($C_2$–$C_{30}$) alkynyl residue, a substituted or unsubstituted ($C_5$–$C_{30}$) cylcoalkylene residue or a substituted or unsubstituted ($C_5$–$C_{30}$) arylene residue which may have one or several heteroatoms, where the residue $R^2$ in each case is bonded to an oxygen atom of the anhydro-carbohydrate unit and the degree of substitution x3 is 0, 1, 2 or 3, Y is a functional group selected from a nitrate-, an aminodesoxy-, a substituted or unsubstituted amino-, a carboxyalkyl-, a hydroxyalkyl-, a sulfonate-, a sulfate-, a carbonate- or a xanthogenate-group, where the degree of substitution x2 is 0, 1, 2 or 3, provided that the sum of x1, x2 and x3 is less than 3 and that x3 shall not be zero over the entire polymer chain, and where n denotes a degree of polymerization between 1 and 10,000, the linkage of the anhydro-carbohydrate units being linear, cyclic, branched or crosslinked.

* * * * *